(12) United States Patent
Aoyama et al.

(10) Patent No.: US 9,957,872 B2
(45) Date of Patent: May 1, 2018

(54) ABNORMALITY DIAGNOSING APPARATUS

(71) Applicant: VOLVO TRUCK CORPORATION, Gothenburg (SE)

(72) Inventors: Yousuke Aoyama, Saitama (JP); Yuuji Kamoda, Saitama (JP); Natsuki Tsushima, Saitama (JP)

(73) Assignee: Volvo Truck Corporation, Gothenburg (SE)

( * ) Notice: Subject to any disclaimer, the term of this patent is extended or adjusted under 35 U.S.C. 154(b) by 0 days. days.

(21) Appl. No.: 14/649,276

(22) PCT Filed: Nov. 14, 2013

(86) PCT No.: PCT/JP2013/080738
§ 371 (c)(1),
(2) Date: Jun. 3, 2015

(87) PCT Pub. No.: WO2014/087820
PCT Pub. Date: Jun. 12, 2014

(65) Prior Publication Data
US 2016/0115849 A1    Apr. 28, 2016

(30) Foreign Application Priority Data

Dec. 3, 2012 (JP) .................................. 2012-264148

(51) Int. Cl.
*F01N 11/00* (2006.01)
*F01N 3/20* (2006.01)
(Continued)

(52) U.S. Cl.
CPC ............ *F01N 11/002* (2013.01); *F01N 3/103* (2013.01); *F01N 3/2066* (2013.01); *F01N 11/00* (2013.01);
(Continued)

(58) Field of Classification Search
CPC ........ F01N 11/00; F01N 11/002; F01N 3/103; F01N 3/2066; F01N 2550/00;
(Continued)

(56) References Cited

U.S. PATENT DOCUMENTS

2006/0272317 A1* 12/2006 Brown .................. F01N 3/0253
60/286

FOREIGN PATENT DOCUMENTS

DE    102008004078 A1    7/2009
JP       03286168 A    12/1991
(Continued)

*Primary Examiner* — Brandon Lee
(74) *Attorney, Agent, or Firm* — Laurence A. Greenberg; Werner H. Stemer; Ralph E. Locher

(57) ABSTRACT

An abnormality diagnosing apparatus configured to diagnose abnormality of a fuel injection amount of a diesel engine includes: an oxidation catalyst provided in an exhaust gas passage; an exhaust gas temperature detector configured to detect an upstream-side exhaust gas temperature and a downstream-side exhaust gas temperature, the upstream-side exhaust gas temperature being an exhaust gas temperature on an upstream side of the oxidation catalyst, the downstream-side exhaust gas temperature being an exhaust gas temperature on a downstream side of the oxidation catalyst; and an abnormality determining unit configured to determine whether the fuel injection amount is excessive or not on the basis of comparison between the upstream-side exhaust gas temperature and the downstream-side exhaust gas temperature.

6 Claims, 4 Drawing Sheets

(51) Int. Cl.
  *F02D 41/22*    (2006.01)
  *F02D 41/40*    (2006.01)
  *F01N 3/10*    (2006.01)
  *F02D 41/02*    (2006.01)
  *F02D 41/14*    (2006.01)

(52) U.S. Cl.
  CPC ....... *F02D 41/1446* (2013.01); *F02D 41/221* (2013.01); *F02D 41/405* (2013.01); *F01N 2550/00* (2013.01); *F01N 2560/06* (2013.01); *F02D 41/029* (2013.01); *F02D 41/0235* (2013.01); *F02D 41/1441* (2013.01); *F02D 41/1463* (2013.01); *Y02T 10/44* (2013.01); *Y02T 10/47* (2013.01)

(58) Field of Classification Search
  CPC ............. F01N 2560/06; F02D 41/1446; F02D 41/221; F02D 41/405; F02D 41/0235; F02D 41/029; F02D 41/1441; F02D 41/1463; Y02T 10/44; Y02T 10/47
  See application file for complete search history.

(56) References Cited

FOREIGN PATENT DOCUMENTS

| | | |
|---|---|---|
| JP | 2001-207897 A | 8/2001 |
| JP | 2005061367 A | 3/2005 |
| JP | 2005061369 A | 3/2005 |
| JP | 2009-250135 A | 10/2009 |
| JP | 2010-144626 A | 7/2010 |
| WO | 03072916 A1 | 9/2003 |
| WO | 2010108790 A1 | 9/2010 |
| WO | 2011119089 A1 | 9/2011 |

* cited by examiner

ABNORMALITY DIAGNOSING APPARATUS

TECHNICAL FIELD

The present invention relates to an abnormality diagnosing apparatus configured to diagnose abnormality of a fuel injection amount of an engine.

BACKGROUND ART

In a fuel injection device of an engine, a fuel injection amount is adjusted in advance in order to suppress variation in the injection amount caused by individual differences. However, since this adjustment is insufficient, the injection amount may deviate from a proper value. Further, the injection amount may deviate from the proper value due to deterioration over time of the fuel injection device. In a case where a fuel is particularly injected larger than the proper value under these cases, fuel efficiency deteriorates and an emission increases.

JP2001-207897A discloses an abnormality detecting apparatus for detecting deviation of a fuel injection amount from a target fuel injection amount on the basis of whether a ratio between an exhaust gas temperature and an engine head temperature is within a proper temperature ratio range or not.

SUMMARY OF INVENTION

However, in the abnormality detecting apparatus described above, since a head temperature sensor for detecting a temperature of a head of the engine needs to be newly provided, a cost thereof rises.

It is an object of the present invention to provide an abnormality diagnosing apparatus capable of diagnosing abnormality of an injection amount of a fuel injection device without newly adding a sensor.

According to an aspect of the present invention, there is provided an abnormality diagnosing apparatus configured to diagnose abnormality of a fuel injection amount of a diesel engine, the abnormality diagnosing apparatus including: an oxidation catalyst provided in an exhaust gas passage; an exhaust gas temperature detector configured to detect an upstream-side exhaust gas temperature and a downstream-side exhaust gas temperature, the upstream-side exhaust gas temperature being an exhaust gas temperature on an upstream side of the oxidation catalyst, the downstream-side exhaust gas temperature being an exhaust gas temperature on a downstream side of the oxidation catalyst; and an abnormality determining unit configured to determine whether the fuel injection amount is excessive or not on the basis of comparison between the upstream-side exhaust gas temperature and the downstream-side exhaust gas temperature.

DESCRIPTION OF EMBODIMENT

Hereinafter, an embodiment of the present invention will be described with reference to the accompanying drawings.

Figure 1:
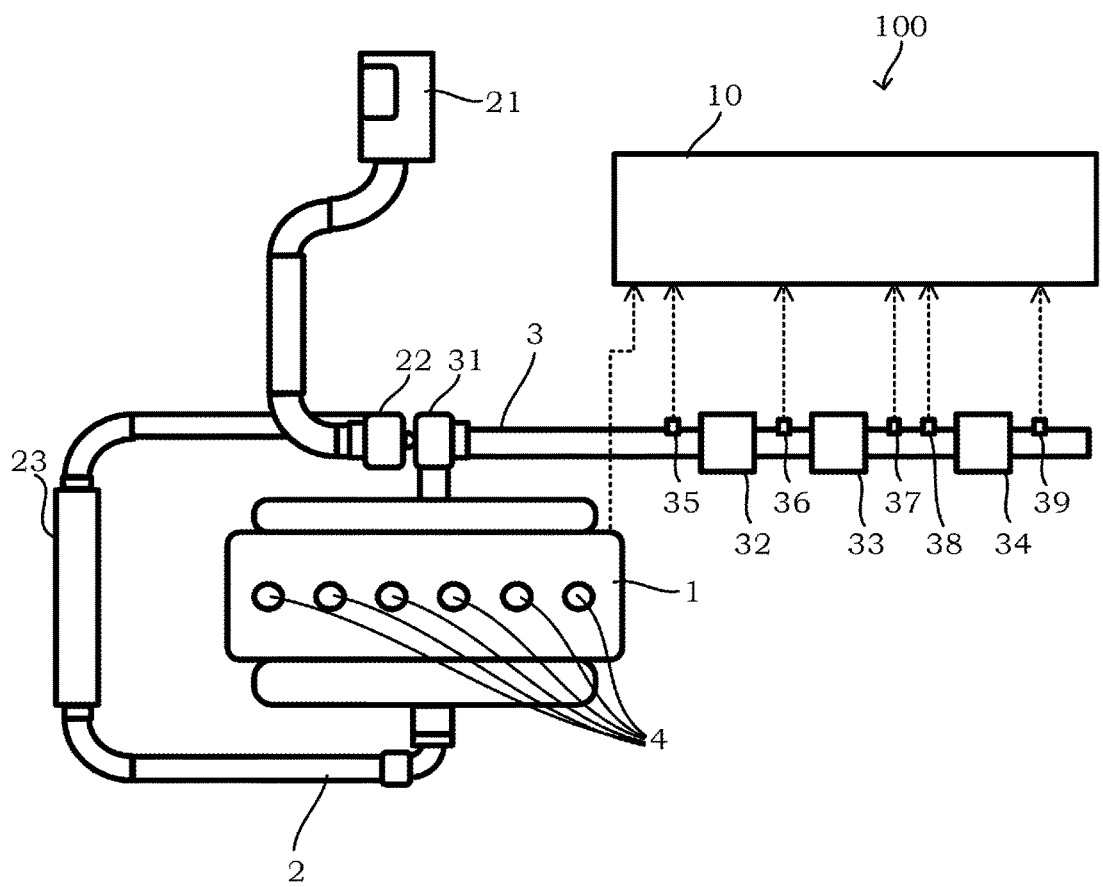
FIG. 1 is a configuration view of an engine on which an abnormality diagnosing apparatus according to an embodiment of the present invention is mounted.

FIG. 1 is a configuration view of a diesel engine 1 (hereinafter, referred to simply as an "engine 1") on which an abnormality diagnosing apparatus 100 according to the present embodiment is mounted.

The engine 1 includes: an intake air passage 2 through which intake air flows; an exhaust gas passage 3 through which exhaust gas after combustion flows; and a fuel injection device (injector) 4 configured to inject a fuel into each cylinder of the engine 1.

The intake air passage 2 has an air cleaner 21, a turbo charger 22, and an intercooler 23 in order from an upstream side. The intake air sucked through the air cleaner 21 is compressed by the turbo charger 22 and cooled by the intercooler 23, and is then taken into a combustion chamber of the engine 1.

The exhaust gas passage 3 has a turbine 31, a DOC (Diesel Oxidation Catalyst) 32, a DPF (Diesel Particulate Filter) 33, and an SCR (Selective Catalytic Reduction) catalyst 34 in order from the upstream side.

The turbine 31 rotates by means of a pressure of the exhaust gas, and rotationally drives the turbo charger 22 arranged coaxially. The DOC 32 oxidizes NO (nitrogen monoxide) in the exhaust gas to $NO_2$ (nitrogen dioxide), and also oxidizes HC, which means an unburned fuel, so as to change the HC to $H_2O$ and $CO_2$. The DPF 33 is a filter configured to collect particulate matters in the exhaust gas. The SCR catalyst 34 selectively reduces and purifies NOx (nitrogen oxides) by using ammonia as a reducing agent generated from an aqueous solution of urea.

The exhaust gas passage 3 further includes a first exhaust gas temperature sensor 35, a second exhaust gas temperature sensor 36, a third exhaust gas temperature sensor 37, a first NOx sensor 38, and a second NOx sensor 39. The first exhaust gas temperature sensor 35 is configured to detect a first exhaust gas temperature. The first exhaust gas temperature is an exhaust gas temperature on a downstream side of the turbine 31 and on an upstream side of the DOC 32. The second exhaust gas temperature sensor 36 is configured to detect a second exhaust gas temperature. The second exhaust gas temperature is an exhaust gas temperature on a downstream side of the DOC 32 and on an upstream side of the DPF 33. The third exhaust gas temperature sensor 37 is configured to detect a third exhaust gas temperature. The third exhaust gas temperature is an exhaust gas temperature on a downstream side of the DPF 33 and on an upstream side of the SCR catalyst 34. The first NOx sensor 38 is configured to detect first NOx concentration. The first NOx concentration is NOx concentration on the downstream side of the DPF 33 and on the upstream side of the SCR catalyst 34. The second NOx sensor 39 is configured to detect second NOx concentration. The second NOx concentration is NOx concentration on a downstream side of the SCR catalyst 34. These sensors are provided for controlling an exhaust gas post-treatment system. The exhaust gas post-treatment system is constructed by the DOC 32, the DPF 33, and the SCR catalyst 34 provided in the exhaust passage 3. A detected value of each of the sensors is transmitted to the controller 10.

Here, the DPF 33 is a filter configured to collect particulate matters in the exhaust gas. For this reason, in a case where the particulate matters accumulated in the DPF 33 increase, the DPF 33 may be clogged. This causes a possibility to deteriorate a purification performance for the exhaust gas. Therefore, in a case where a certain condition, such as a condition that a differential pressure between the upstream side and the downstream side of the DPF 33 is at a predetermined pressure or more, is satisfied, DPF regeneration is carried out. In the DPF regeneration, the particulate matters accumulated in the DPF 33 are burned and removed. At the DPF regeneration, the fuel injection device 4 of the engine 1 carries out post-injection after fuel injection in a normal operation state. In the post-injection, a fuel is additionally injected mainly in an expansion stroke or an exhaust stroke. The unburned fuel exhausted into the exhaust gas passage 3 by means of the post-injection is oxidized (burned) in the DOC 32. Reaction heat causes the exhaust gas temperature thereof to be raised, and the particulate matters accumulated in the DPF 33 are burned and removed.

If the exhaust gas temperature in the DPF regeneration is too high, the DPF 33 and the SCR catalyst 34 are deteriorated. On the other hand, if the exhaust gas temperature is too low, the particulate matters are not burned. For this reason, it needs to control the exhaust gas temperature within an appropriate temperature range. Therefore, the controller 10 monitors a temperature rise state of the exhaust gas on the basis of the first exhaust gas temperature, the second exhaust gas temperature, and the third exhaust gas temperature when the DPF regeneration described above is carried out.

Further, the SCR catalyst 34 needs to be controlled so that NOx with specified concentration or higher is not discharged to the atmosphere by adjusting denitrification capacity by ammonia in accordance with the NOx concentration. Therefore, the controller 10 always monitors the first NOx concentration and the second NOx concentration.

Next, the abnormality diagnosing apparatus 100 configured to diagnose an abnormality of the fuel injection amount for this engine 1 will be described.

The abnormality diagnosing apparatus 100 includes: the controller 10 as an abnormality determining unit; the first exhaust gas temperature sensor 35 as an exhaust gas temperature detector; the second exhaust gas temperature sensor 36 as the exhaust gas temperature detector; and the first NOx sensor 38. In this regard, the first exhaust gas temperature sensor 35, the second exhaust gas temperature sensor 36, and the first NOx sensor 38 are essential constituents for the exhaust gas post-treatment system as described above, and they are not sensors newly added in the present embodiment.

Figure 2:
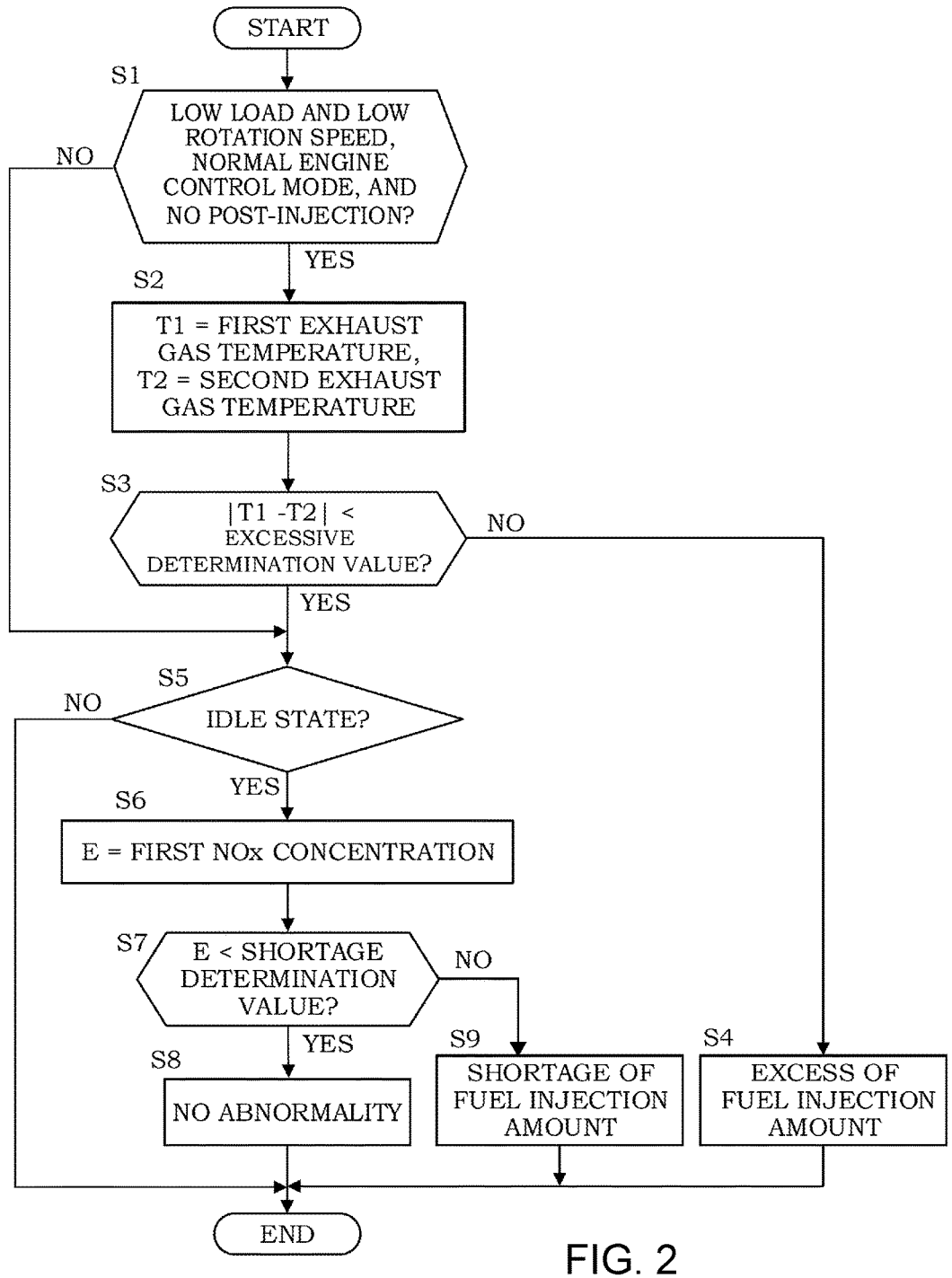
FIG. 2 is a flowchart illustrating processing content of a controller.

FIG. 2 is a flowchart illustrating processing content of the controller 10. This processing is repeatedly executed at every small time (10 ms, for example) during an operation of the engine 1.

At Step S1, the controller 10 determines whether all conditions are satisfied or not. The all conditions include a condition that the engine 1 is operated at a low load and a low rotation speed, a condition that it is in a normal engine control mode, and a condition that the post-injection is not being carried out. In a case where all the conditions are satisfied, the processing proceeds to Step S2. In a case where any one of all the conditions is not satisfied, the processing proceeds to Step S5.

The condition that the engine 1 is operated at the low load and the low rotation speed (which means a condition that a high-load operation is not carried out) is established when both a condition that an engine torque is within a low load range in which the engine torque is smaller than a predetermined fuel increase load value and a condition that the engine rotation speed is within a predetermined low rotation speed range are satisfied. The normal engine control mode is not established in a case where the engine 1 is in an operation mode in which the more fuel is injected than that in a normal operation mode.

At Step S2, the controller 10 stores the first exhaust gas temperature detected by the first exhaust gas temperature sensor 35 as a temperature T1 and stores the second exhaust gas temperature detected by the second exhaust gas temperature sensor 36 as a temperature T2.

At Step S3, the controller 10 determines whether an absolute value of a difference between the temperature T1 and the temperature T2 is smaller than an excessive determination value or not. In a case where it is determined that the difference is smaller than the excessive determination value, the processing proceeds to Step S5. On the other hand, in a case where it is determined that the difference is the excessive determination value or more, the processing proceeds to Step S4, and it is determined that the fuel injection amount is excessive. The excessive determination value is set in advance to a value of an extent by which it can be determined that the fuel injection amount is excessive.

Figure 3:
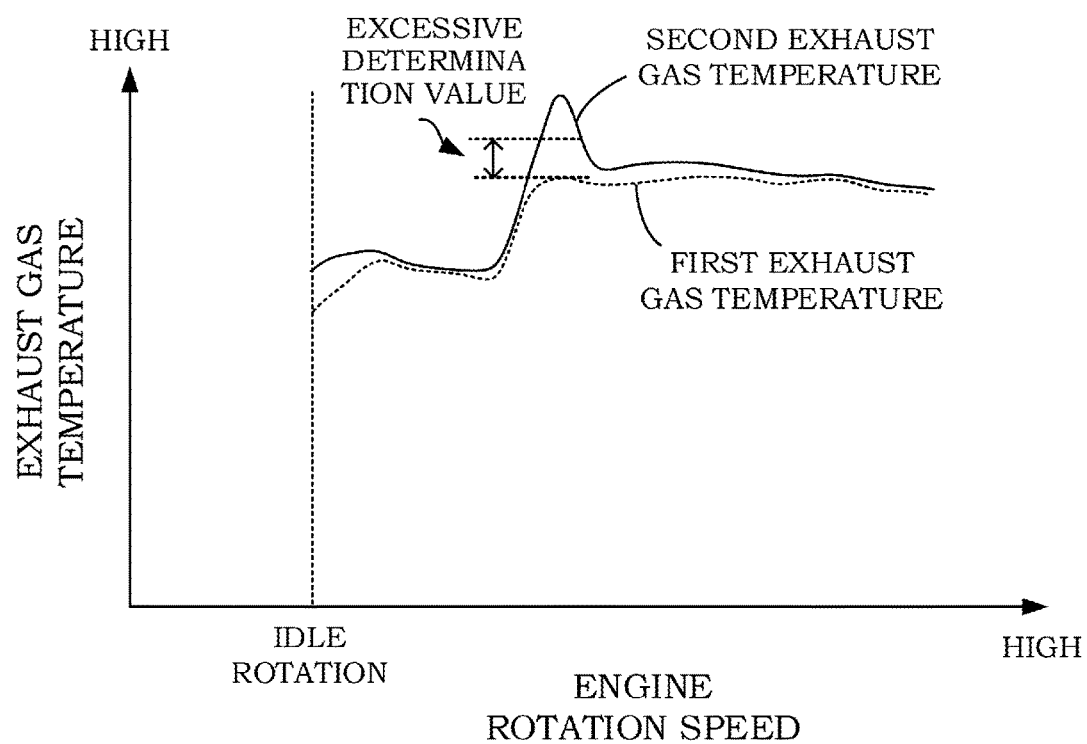
FIG. 3 is a view showing a relationship between an engine rotation speed and an exhaust gas temperature.

Here, FIG. 3 is a view showing a relationship between an engine rotation speed and the first exhaust gas temperature and a relationship between the engine rotation speed and the second exhaust gas temperature in a case where the fuel injection amount is excessive. In a case where the fuel injection amount is excessive, the excessive fuel is oxidized in the DOC 32, whereby generating reaction heat. For this reason, the second exhaust gas temperature becomes higher than the first exhaust gas temperature.

However, in a case where the engine rotation speed is high, a flow velocity of the exhaust gas is high. For this reason, a temperature rise width of the exhaust gas in the DOC 32 becomes smaller, whereby it is difficult to determine whether the fuel injection amount is excessive or not. Further, in a case where the engine torque is large, the fuel injection amount is large in the first place. Thus, it is also difficult to determine whether the fuel injection amount is excessive or not. Moreover, in a case where the post-injection is carried out for the DPF regeneration, the fuel injection amount is intentionally injected excessively. For this reason, it is difficult to determine whether the fuel injection amount is excessive or not.

Therefore, in a case where it is determined at Step S1 that all the conditions, that is, the condition that the engine 1 is operated at the low load and the low rotation speed, the condition that it is in the normal engine control mode, and the condition that the post-injection is not being carried out, are satisfied and it is determined that the absolute value of the difference between the temperature T1 and the temperature T2 is the excessive determination value or higher, it is determined that the fuel injection amount is excessive.

At Step S5, the controller 10 determines whether the engine 1 is in the idle state or not. In a case where it is determined that the engine 1 is in the idle state, the processing proceeds to Step S6. In a case where it is determined that the engine 1 is not in the idle state, the processing is terminated. The idle state means a state of the engine 1 in which a vehicle is stopped and a driver has no intention of acceleration thereof.

At Step S6, the controller 10 stores the first NOx concentration as concentration E.

At Step S7, the controller 10 determines whether the concentration E is smaller than a shortage determination value or not. In a case where it is determined that the concentration E is smaller than the shortage determination value, the processing proceeds to Step S8, and it is determined that there is no abnormality in the fuel injection amount. On the other hand, in a case where it is determined that the concentration E is the shortage determination value or more, the processing proceeds to Step S9, and it is determined that the fuel injection amount is short. The shortage determination value is set in advance to a value of an extent by which it can be determined that the fuel injection amount is short.

Figure 4:
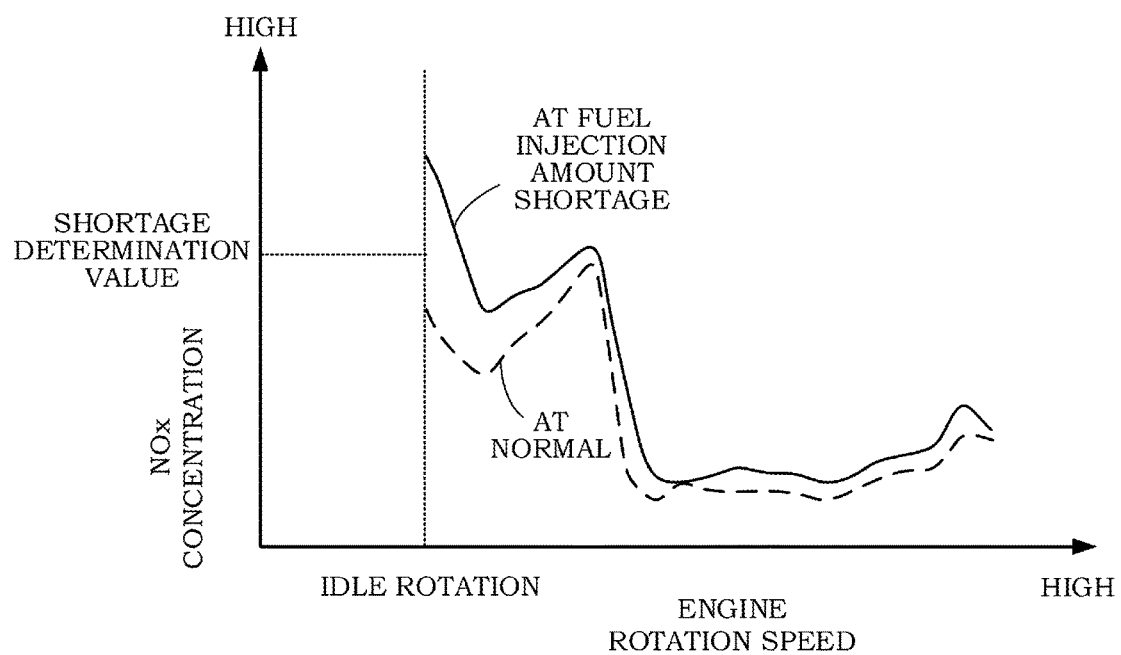
FIG. 4 is a view showing a relationship between the engine rotation speed and NOx concentration.

Here, FIG. 4 is a view showing a relationship between the engine rotation speed and the first NOx concentration. FIG. 4 shows the relationship when the injection amount is short by means of a solid line, and the relationship at normal time by means of a broken line. In a case where the fuel injection amount is short, the NOx concentration in the exhaust gas becomes higher. This causes the first NOx concentration to become higher. In a case where the engine rotation speed is high, no remarkable difference is generated as compared with the normal time. However, in a case where the engine 1 is in the idle state, the first NOx concentration becomes higher in accordance with shortage of the fuel injection amount. Thus, in a case where it is determined at Step S5 that the engine 1 is in the idle state and it is determined that the first NOx concentration is the shortage determination value or more, it is determined that the fuel injection amount is short.

In summarizing the control described above, the controller 10 determines whether the fuel injection amount is excessive or not at Steps S1 to S3, and determines whether the fuel injection amount is short or not at Steps S5 to S7.

According to the embodiment described above, the following effects are exerted.

By comparing the first exhaust gas temperature detected by the first exhaust gas temperature sensor 35 provided on the upstream side of the DOC 32 with the second exhaust gas temperature detected by the second exhaust gas temperature sensor 36 provided on the downstream side of the DOC 32, it is determined whether the fuel injection amount of the engine 1 is excessive or not. In the engine 1 in which the DOC 32 is provided in the exhaust passage 3, the exhaust gas temperature sensors 35 and 36 are respectively provided on the upstream side and the downstream side of the DOC 32 in order to monitor the temperature rise state of the exhaust gas due to oxidation of the fuel in the DOC 32. Therefore, abnormality diagnosis of the fuel injection device 4 can be carried out by using an existing system without newly adding a sensor in the present embodiment.

Moreover, the abnormality diagnosis is carried out on the basis of the exhaust gas temperature of the exhaust gas passage 3 through which the exhaust gas exhausted from each of the cylinders joins and flows. Therefore, even if all the cylinders are uniformly abnormal and there is no variation among the cylinders, the abnormality diagnosis can be carried out with accuracy.

Moreover, it is determined that the fuel injection amount is excessive in a case where the difference between the first exhaust gas temperature and the second exhaust gas temperature is the excessive determination value or higher. Therefore, abnormality of the fuel injection amount can be determined with more accuracy.

Moreover, the detected value of the second exhaust gas temperature sensor 36 provided on the upstream side of the DPF 33 is used as the exhaust gas temperature on the downstream side of the DOC 32. For this reason, the temperature difference between the upstream side and the downstream side of the DOC 32 can be compared without being affected by the heat generated by means of combustion of the particulate matters in the DPF 33, and this makes it possible to determine the abnormality of the fuel injection amount with more accuracy.

Moreover, it is determined whether the fuel injection amount is excessive or not in a case where all the conditions, that is, the condition that the engine 1 is operated at the low load and the low rotation speed, the condition that the engine is in the normal engine control mode, and the condition that the post-injection is not being carried out, are satisfied. For this reason, the determination is carried out in an operation region in which the fuel injection amount is relatively small, and this makes it possible to determine the abnormality of the fuel injection amount with more accuracy.

Moreover, in a case where the first NOx concentration detected by the first NOx sensor 38 provided on the downstream side of the DOC 32 and on the upstream side of the SCR catalyst 34 is the shortage determination value or more, it is determined that the fuel injection amount is short. In the engine 1 in which the SCR catalyst 34 is provided, the NOx sensors are respectively provided on the upstream side and on the downstream side of the SCR catalyst 34 in order to adjust the denitrification capability in the SCR catalyst 34. Therefore, the abnormality diagnosis of the fuel injection device 4 can be carried out by using the existing system without newly adding a sensor in the present embodiment.

Moreover, it is determined whether the fuel injection amount is short or not in a case where the engine 1 is in the idle state. For this reason, the determination is carried out in the operation state in which the NOx concentration remarkably increases as compared with the normal time, and this makes it possible to determine the abnormality of the fuel injection amount with more accuracy.

The embodiment of the present invention has been described above, but the above embodiment is merely one of examples of application of the present invention, and the technical scope of the present invention is not limited to the specific configurations of the above embodiment.

For example, in the embodiment described above, the detected value of the second exhaust gas temperature sensor 36 is used as the exhaust gas temperature on the downstream side of the DOC 32. However, the detected value of the third exhaust gas temperature sensor 37 may be used.

Moreover, in the embodiment described above, it is determined whether the fuel injection amount is short or not in a case where the engine 1 is in the idle state. However, the operation region for which the determination is made may be expanded to a state in which the engine 1 is at a relatively low load and a relatively low rotation speed other than the idle state.

The present application claims priority based on Japanese Patent Application No. 2012-264148 filed with the Japan Patent Office on Dec. 3, 2012, the entire content of which is incorporated into this specification by reference.

The invention claimed is:

1. An abnormality diagnosing apparatus configured to diagnose abnormality of a fuel injection amount of a fuel injection device configured to inject a fuel into each cylinder of a diesel engine, the abnormality diagnosing apparatus comprising:
    an oxidation catalyst provided in an exhaust gas passage;
    a first exhaust gas temperature sensor configured to detect an upstream-side exhaust gas temperature, the upstream-side exhaust gas temperature being an exhaust gas temperature on an upstream side of the oxidation catalyst;
    a second exhaust gas temperature sensor configured to detect a downstream-side exhaust gas temperature, the downstream-side exhaust gas temperature being an exhaust gas temperature on a downstream side of the oxidation catalyst; and a controller detecting a condition of the diesel engine; wherein the controller is:

configured to retrieve the upstream-side exhaust gas temperature detected by the first exhaust gas temperature sensor and the downstream-side exhaust gas temperature detected by the second exhaust gas temperature sensor when a predetermined condition that the diesel engine is operated and a post-injection is not being carried out;

configured to determine whether a difference between the upstream-side exhaust gas temperature and the downstream-side exhaust gas temperature is higher or not higher than an excessive determination value; and configured to determine the fuel injection amount, which is used for operating the diesel engine, of the fuel injection device, at the predetermined condition that the diesel engine is operated, is excessive in case the difference between the upstream-side exhaust gas temperature and the downstream-side exhaust gas temperature is higher than the excessive determination value.

2. The abnormality diagnosing apparatus according to claim 1, wherein the exhaust gas passage includes a filter configured to collect particulate matters in an exhaust gas on the downstream side of the oxidation catalyst of the exhaust gas passage, and wherein the second exhaust gas temperature sensor detects an exhaust gas temperature on an upstream side of the filter as the downstream-side exhaust gas temperature.

3. The abnormality diagnosing apparatus according to claim 2, wherein the controller determines whether the fuel injection amount of the fuel injection device, at a condition that the diesel engine is operated, is excessive or not in a case where post injection is not carried out and a high-load operation is not carried out, the post injection being fuel injection that is carried out in order to burn the particulate matters accumulated in the filter, and the high load operation is a load requested by the diesel engine that is larger than a fuel increase load amount in a low-load operation, as the predetermined condition of the diesel engine.

4. The abnormality diagnosing apparatus according to claim 1, further comprising: a first nitrogen oxide sensor, a second nitrogen oxide sensor, and an SCR catalyst, in the exhaust gas passage, wherein:

the SCR catalyst is configured to reduce and purify nitrogen oxides in an exhaust gas on the downstream side of the oxidation catalyst of the exhaust gas passage, the first nitrogen oxide sensor is configured to set on a downstream side of the oxidation catalyst, the second nitrogen oxide sensor is configured to set on an upstream side of the SCR catalyst, and wherein the controller is configured to determine that the fuel injection amount of the fuel injection device, at a condition that the diesel engine is operated, is short in a case where a concentration of the nitrogen oxides detected by the first nitrogen oxide sensor and the second nitrogen oxide sensor is a shortage determination value or higher as the predetermined condition of the diesel engine.

5. The abnormality diagnosing apparatus according to claim 4, wherein the controller determines whether the fuel injection amount of the fuel injection device, at a condition that the diesel engine is operated, is short or not in a case where the diesel engine is in an idle state.

6. The abnormality diagnosing apparatus according to claim 1, wherein the controller determines there is no abnormality in the fuel injection amount of the fuel injection device upon determining that the difference between the upstream-side exhaust gas temperature and the downstream-side exhaust gas temperature is not higher than the excessive determination value.

* * * * *